Oct. 27, 1970      G. A. KENDALL      3,536,334

HIGH PRESSURE SEAL

Filed June 13, 1968

INVENTOR.
GILES A. KENDALL
KENDRICK and SUBKOW
BY
ATTORNEYS

United States Patent Office 3,536,334
Patented Oct. 27, 1970

3,536,334
HIGH PRESSURE SEAL
Giles Arthur Kendall, Tarzana, Calif., assignor to Menasco Manufacturing Company, Burbank, Calif., a corporation of California
Filed June 13, 1968, Ser. No. 736,691
Int. Cl. F16j 15/00, 17/00
U.S. Cl. 277—103                                10 Claims

ABSTRACT OF THE DISCLOSURE

A liquid seal comprising: a housing having a bore adapted to contain a liquid under pressure; a movable plate positioned within said bore, said movable plate having a central opening and an axially extending flange terminating in a lip; a fixed plate positioned within said bore in fixed relation to said housing and having a central opening, said fixed plate positioned outwardly of said movable plate in nested engagement with said axially extending flange; a shaft extending through said central openings in said movable and fixed plates; a groove in the outer surface of said flange; a plurality of holes passing through said flange and extending into said groove; vent means extending from said lip to a region of reduced pressure, and a resilient, essentially noncompressible sealant material contained in the region between said fixed and movable plates and in said holes and said groove, whereby on movement of said movable plate toward said fixed plate, said sealant material exerts a variable sealing pressure against the surface of said shaft and against the interior of said bore, which pressure is in excess of the liquid pressure within said housing and which varies with the extent of movement of said movable plate.

---

This invention relates to an improved high pressure fluid seal. More specifically, the invention pertains to an improved high pressure fluid seal for sealing a movable shaft with respect to a housing containing fluid under pressure.

High pressure liquid seals are used in many applications. As an example, such seals are employed in liquid springs in which a confined compressible fluid exerts a reactive force on a piston and piston rod which extend into the compressible fluid when the spring is subjected to loads. Liquid springs are well known to the art and reference is made to such springs only to illustrate one area where high pressure liquid seals are commonly employed.

A common form of high pressure seal, which has been used previously in sealing liquid springs, employs a fixed annular plate, a movable annular plate, and a resilient sealant material positioned between said plates. Both plates contain a central bore which accommodates a movable piston rod while the exterior peripheral surfaces of both plates contact a housing which contains a liquid under pressure. The movable annular plate is in contact with the fluid contained within the housing such that an increase in the pressure of the fluid therein forces the movable annular plate in the direction of the fixed annular plate which is positioned outwardly thereof to exert a compressive force on resilient sealant material positioned between the two plates. As the sealant material is compressed, it expands radially and exerts a sealing force against the movable piston rod to prevent leakage of fluid between the movable piston rod and the central bore extending through the movable and fixed plates.

In order to increase the radial force exerted on the piston rod by the compressible sealant material in the seal described above, a common practice has been to drill a plurality of aligned holes through the movable plate, the compressible material, and the fixed plate. Contained within the holes are pins which are fixedly connected to the movable plate and which move therewith in sliding relation with respect to the holes in the sealant material and the fixed plate. The area beneath the movable pins is vented to the atmosphere such that only atmospheric pressure is exerted against the bottom of the pins. The total force exerted on the movable plate by the high pressure fluid within the housing is equal to the area of the movable plate exposed to the high pressure fluid multiplied by the pressure exerted by the fluid per unit area. The force which resists movement of the plate is equal to the area of the sealant material in contact with the movable plate multiplied by the pressure exerted by the sealant material per unit area. The area of the sealant material in contact with the movable plate is less than the area of the movable plate exposed to the high pressure liquid due to the reduction in the area of the sealant material by the holes drilled therein which are occupied by the movable pins. As a result, the pressure in the sealant material is greater than the pressure of the high pressure liquid. The radial pressure exerted by the sealant material against the movable piston rod is thus greater than the pressure of the fluid in contact with the movable plate such that leakage between the piston rod and the sealant material in contact therewith is prevented. Such a high pressure liquid seal of the prior art is disclosed in U.S. Pat. 2,308,149.

The above described high pressure liquid seals of the prior art are quite complex and therefore costly to manufacture. The holes extending through the sealant material and the fixed and movable plates must be accurately dimensioned to provide a close fit with the movable pins. Moreover, the pins must be accurately dimensioned and the holes in the fixed plate, the movable plate and the compressible material must be carefully aligned. These requirements demand extensive machining operations which materially increase the cost of the seal.

An object of the present invention is to provide a high pressure liquid seal which is far simpler in structure than the above described seals of the prior art. Additional objects will become apparent from a reading of the specification and claims which follow.

In providing an improved high pressure liquid seal, I employ a movable plate having a central bore and an exterior surface in contact with the bore of a housing adapted to contain high pressure fluid. The inner surface of the movable plate is in contact with high pressure fluid contained within the housing. Integral with the outer surface of the movable plate is an axial flange within which is nested a fixed plate whose inner surface is spaced from the outer surface of the movable plate. The region between the fixed and movable plates contains a resilient, essentially noncompressible sealant material which is placed under compression on movement of the movable plate toward the fixed plate.

The flange of the movable plate terminates in a lip which is exposed to reduced pressure. Thus, the area of the sealant material under compression is less than the area of the inner surface of the movable plate in contact with the high pressure fluid. As a result, the pressure within the sealant material is greater than the pressure exerted by the high pressure liquid.

A shaft passes through central openings in the fixed and movable plates. As the movable plate moves toward the fixed plate, the sealant material contained in the region between the two plates expands radially into contact with the surface of the shaft. Since the pressure exerted by the sealant material is greater than that of the high pressure fluid, the radial pressure exerted by the sealant material against the shaft surface prevents leakage of fluid at the area of contact between the sealant material and the shaft.

The movable plate may also contain an exterior groove in the axial flange thereof and a number of holes extending from the groove into the region between the fixed and movable plates. Sealant material, as contained in the region between the fixed and movable plates, may also be contained in the groove and in the holes connecting the groove with the region bounded by the fixed and movable plates. On movement of the movable plate with respect to the fixed plate, the sealant material exerts a radial force against the exterior of the movable shaft and, in addition, exerts an outward radial force in the region of the groove against the bore of the housing which surrounds the movable plate.

Further, to illustrate my invention, reference is made to the accompanying drawings, in which.

Figure 1:
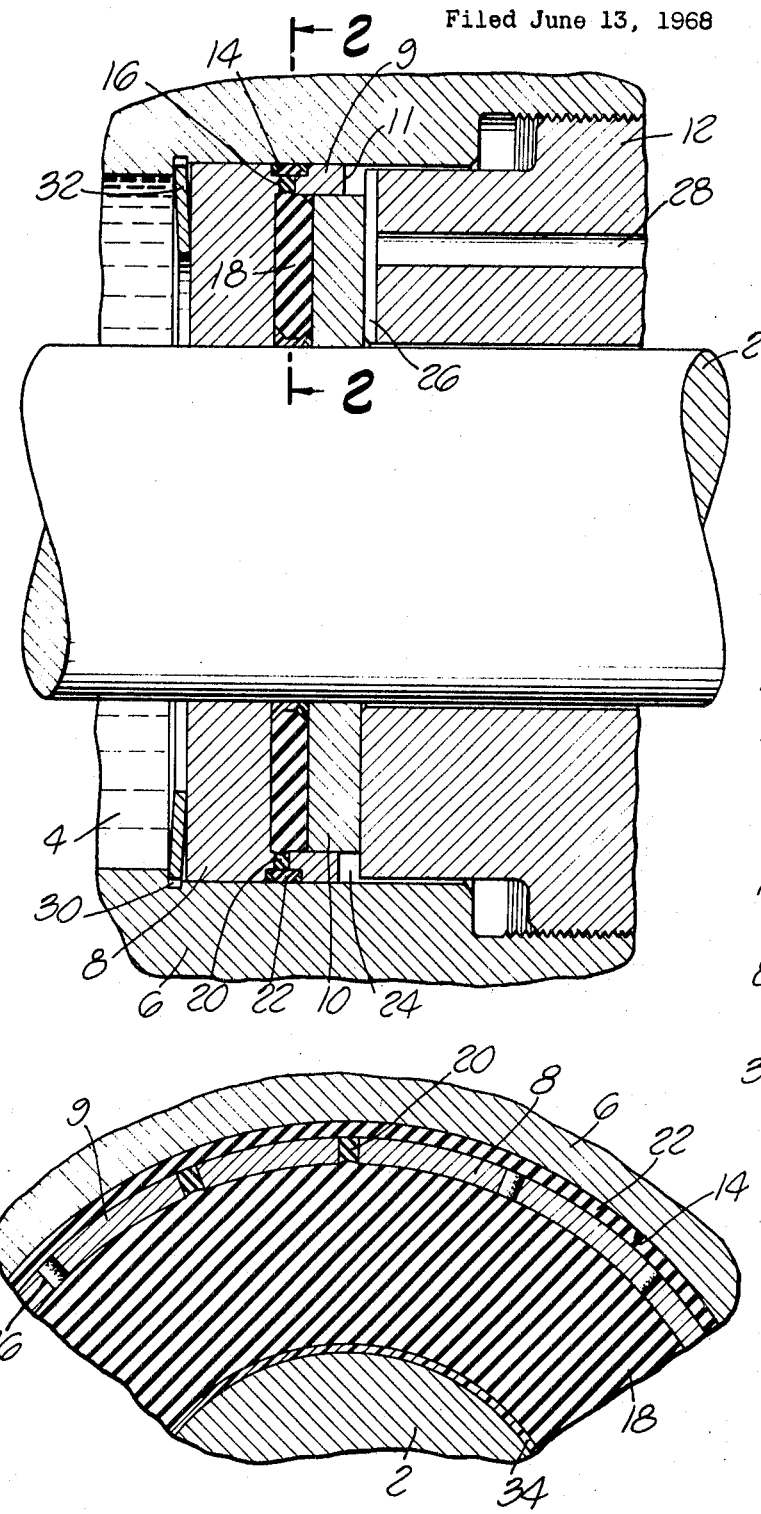
FIG. 1 is a longitudinal sectional view of an improved seal according to the invention.

As shown in FIG. 1, a shaft 2 extends into a high pressure liquid 4 confined within a housing 6. The axis of the shaft 2 lies along the axis of the housing 6 and the shaft may move longitudinally along its axis with respect to the housing 6.

A movable annular plate 8 having an axial flange 9 is slidably confined within the bore of the housing 6. A fixed plate 10 is held in nested engagement within the flange 9 by means of a closure member 12 which threadedly engages the housing 6. In the area between the movable plate 8 and the fixed plate 10 is confined a resiliently deformable but substantially noncompressible sealant material 18.

An exterior peripheral groove 14 in the flange 9 communicates with the region between movable plate 8 and fixer plate 10 containing the sealant material 18 through a plurality of spaced radial holes 16. The exterior groove 14 contains a ring of sealant material 22 and the radial holes 16 are filled with plugs 20 of sealant material.

The flange 9 terminates in an outer lip 11 defining the inner surface of vent area 24. The vent area 24 communicates via vent passages 26 and 28 with the atmosphere such that the pressure within vent area 24 is atmospheric. A Belleville spring 32 is confined in a groove 30 within the bore of housing 6 and bears against the inner surface of the movable plate 8 to maintain a minimum pressure on sealant material 18, even under conditions when the pressure exerted by the liquid 4 is relatively low.

Figure 2:
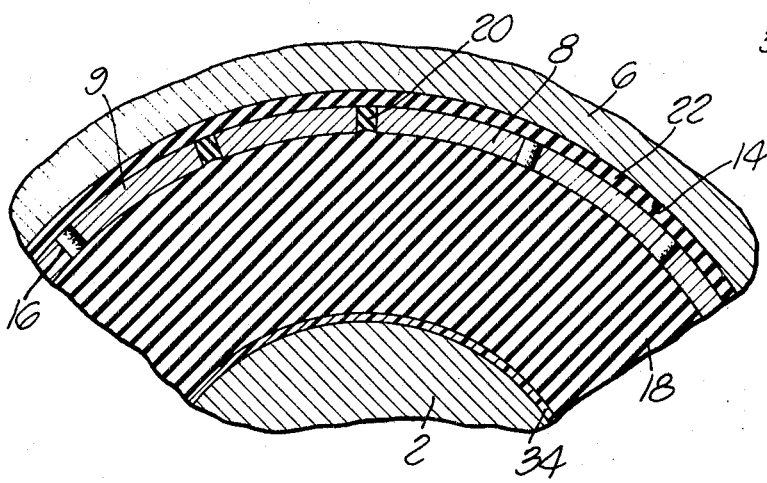
FIG. 2 is a cross-sectional view taken along the line 2—2 of FIG. 1.

Turning to FIG. 2, which is a section taken along the lines 2—2 of FIG. 1, the exterior peripheral groove 14 communicates with the region between the movable plate 8 and fixed plate 10 and the sealant material 18 therein through spaced radial holes 16 in the axial flange 9 of movable plate 8. Plugs of sealant material 20 are contained within the radial holes 16 and a ring of sealant material 22 is contained within the exterior peripheral groove 14.

Figure 3:
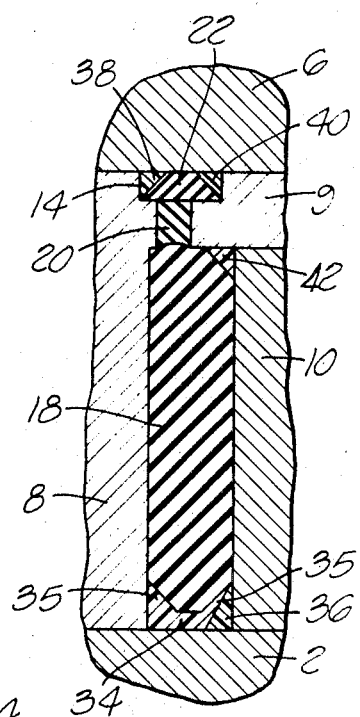
FIG. 3 is an enlarged cross-sectional view of the region between the fixed and the movable plates, as shown in FIG. 1.

As shown best in FIG. 3, a slipper seal 34 fitted about the shaft 2 is in contact with the compressible material 18. The slipper seal is generally made of Teflon or a similar soft, low-friction plastic material. Preferably, the slipper seal 34 has the configuration shown in cross section in FIG. 3 having two delta portions 35 which diverge outwardly from the shaft 2. In contact with the slipper seal 34 is a retaining ring 36 fitted about shaft 2 and having a wedge-shaped configuration in cross section. The retaining ring 36 contacts the inner wall of fixed plate 10 and one of the delta portions 35 of slipper seal 34. Ring 36 is preferably constructed of a relatively hard plastic such as nylon, or nylon loaded with a lubricant such as molybdenum disulfide to provide a suitably low coefficient of friction between the retaining ring 36 and and the shaft 2.

Retaining rings 38 and 40, each having a generally wedge-shaped configuration are confined in the exterior groove 14. Rings 38 and 40 each bear against a lateral side of groove 14 and also against the inner bore of the housing 6. As in the case of the retaining ring 36, retaining rings 38 and 40 are preferably made of nylon or a similar hard plastic and may be loaded with a solid lubricant so as to provide a low coefficient of friction between the rings 38 and 40 and the bore of the housing 6.

A further retaining ring 42 having a generally wedge-shaped configuration in cross section has sides which bear against the inner face of the fixed plate 10 and against the inner surface of flange 9. Retaining ring 42 is preferably made of a hard plastic material, such as nylon, and may, as in the case of the other retaining rings, be loaded with a solid lubricant to provide a low coefficient of friction between the ring 42 and the inner peripheral wall of flange 9.

In use, my high pressure seal provides a variable sealing force between the shaft 2 and the housing 6. To illustrate, as the pressure of the confined liquid 4 is increased, the movable plate 8 is forced outwardly in the direction of the fixed plate 10. This results in reducing the spacing between the movable plate 8 and the fixed plate 10 and thereby compressing the sealant material 18.

The total force exerted on the movable plate 8 by the confined liquid 4 is equal to the pressure of the liquid 4 multiplied by the area of the inner surface of the plate 8 in contact therewith. The force resisting the outward movement of the plate 8 is equal to the area of the outer surface of plate 8 in contact with sealant material 18 multiplied by the pressure per unit area exerted against the outer surface of plate 8 by the sealant material. When the movable plate 8 is at rest, as will be the case when the pressure of liquid 4 is not changing, the total force exerted against the inner surface of plate 8 by the liquid 4 is resisted by an equal force exerted on the outer surface of plate 8 by the compressible material 18. Since the area of the outer surface of the plate 8 in contact with compressible material 18 is less than the inner surface area of plate 8 in contact with the liquid 4, the pressure within the sealant material 18 is greater than the pressure of the liquid 4. Excluding the force exerted against the inner surface of plate 8 by the Belleville spring 32, the ratio of the pressure of liquid 4 to the pressure in the sealant material 18 is inversely proportional to the ratio of the area of the inner surface of plate 8 in contact with liquid 4 with respect to the outer surface area of plate 8 in contact with compressible material 18.

As the compressible material 18 is subjected to pressure by the movement of plate 8 in the direction of fixed plate 10, the compressible material 18 exerts a radial force against the slipper 34, thereby holding it in tight contact with the outer surface of shaft 2. The slipper 34, being made of a relatively soft material, may be deformed slightly. Due to its delta-shaped configuration, the force exerted by the sealant material 18 is applied against the inner surfaces of the two delta portions 35 which forces the slipper 34 into tight wedging engagement with the retaining ring 36 thereby compressing it against the outer surface of shaft 2 to prevent extrusion of the sealant material 18 between the fixed plate 10 and shaft 2. The forces exerted on the inner face of the other delta portion 35 of slipper 34 forces the slipper into tight wedging engagement with the inner wall of plate 8 and the surface of shaft 2 to prevent extrusion of material 18 between the movable plate 8 and the shaft 2.

As the sealant material 18 is placed under compression, the pressure within the material 18 is transmitted equally in all directions. Thus, the material 18 flows outwardly in a radial direction into the holes 16 where it mixes with the plugs 20 therein and transmits the compressive force to the sealant material 22. The pressure is transmitted through the ring of sealant material 22 against the inner bore of housing 6 to provide a tight seal therewith. The pressure exerted by sealant material 22 exerts force on both the retaining rings 38 and 40, thereby wedging the rings tightly into the corner areas formed by the intersection of the lateral sides of groove 14 with the inner bore of the housing 6. The wedged retaining rings 38 and 40 thereby prevent extrusion of the sealant material between the movable plate 8 or fixed plate 10 and the inner bore of housing 6.

Extrusion of sealant material 18 between the inner peripheral surface of flange 9 and the outer peripheral surface of fixed plate 10 is prevented by retaining ring 42, which is likewise wedged tightly into contact with both the inner surface of flange 9 and the inner surface of fixed plate 10 by the pressure exerted by sealant material 18.

In order to avoid leakage when the pressure of the fluid 4 is at a relatively low level, the Belleville spring 32 exerts an outward force on the movable plate 8 at all times to provide a minimum pressure on the sealant material 18. Thus, even if the pressure of the liquid 4 were to drop to a relatively low level, leakage would be prevented by the force exerted by the Belleville spring 32. As stated previously, the outer lip 11 of flange 9 is under atmospheric pressure. Thus, the lip 11 is not subjected to pressure during movement of the plate 8.

As shown in FIGS. 1 and 3 of the drawings, the radial holes 16 are set well back from the inner surface of the fixed plate 10. Thus, the holes remain open at all times, even under the maximum pressure conditions for the seal, when the movable plate 8 has been moved the greatest distance toward the fixed plate 10.

In describing my novel seal in the foregoing specification, reference has been made to a preferred embodiment thereof for purposes of illustration. It should be understood, however, that the foregoing description is by way of illustration rather than limitation. Thus, I desire that my invention be limited only within the terminology and spirit of the appended claims.

I claim:
1. A liquid seal comprising:
   a housing having a bore adapted to contain a liquid under pressure;
   a movable plate positioned within said bore, said movable plate having a central opening and an axially extending flange terminating in a lip;
   a fixed plate positioned within said bore in fixed relation to said housing and having a central opening, said fixed plate positioned outwardly of said movable plate in nested engagement with said axially extending flange;
   a shaft extending through said central openings in said movable and fixed plates;
   a groove in the outer surface of said flange;
   a plurality of holes passing through said flange and extending into said groove;
   vent means extending from said lip to a region of reduced pressure, and
   a resilient, essentialy noncompressible sealant material contained in the region between said fixed and movable plates and in said holes and said groove, whereby on movement of said movable plate toward said fixed plate, said sealant material exerts a variable sealing pressure against the surface of said shaft and against the interior of said bore, which pressure is in excess of the liquid pressure within said housing and which pressure varies with the extent of movement of said movable plate.

2. The liquid seal of claim 1, including means resiliently biasing said movable plate in the direction of said fixed plate to maintain a minimum pressure on said sealant material.

3. The liquid seal of claim 1, including retaining rings positioned in said groove in contact with the sides of said groove and with the bore of said housing.

4. The liquid seal of claim 3, including a slipper surrounding said shaft, said slipper positioned in the region between said movable and fixed plates and in contact with said resilient sealant material.

5. The liquid seal of claim 4, including a retaining ring surrounding said shaft in wedging engagement with said slipper such that pressure applied to said slipper from said sealant material forces said retaining ring in contact with said slipper into tight sealing engagement with said shaft and the inner surface of said fixed palte.

6. The liquid seal of claim 5, including a retaining ring positioned in contact with both the inner surface of said fixed plate and the inner surface of said flange, whereby pressure exerted by said sealant material forces said ring into tight sealing engagement with said flange and said fixed plate.

7. A liquid seal comprising:
   a housing having a central bore adapted to contain a liquid under pressure;
   a movable annular plate having a central opening and an outer peripheral surface slidably positioned within said bore;
   said movable annular plate having an axially extending, outwardly directed flange terminating in a lip, the outer peripheral surface of said flange positioned within said bore;
   a fixed annular plate positioned within said bore and having a central opening, the outer peripheral surface of said fixed plate slidably engaging the inner peripheral surface of said flange;
   means fixedly holding said fixed plate with respect to said housing;
   a shaft extending through the central openings of said movable and fixed annular plates in slidable engagement therewith; ;
   a groove in the outer peripheral surface of said flange;
   a plurality of radially directed holes extending through said flange from the region between said movable and fixed plates into said groove;
   vent means extending from said lip to the atmosphere, and
   a resilient, essentially noncompressible sealant material contained in the region between said fixed and movable plates and in said holes and said groove, whereby on movement of said plate toward said fixed plate said sealant material exerts a variable sealing pressure against the surface of said shaft and the interior of said bore, which pressure is in excess of the pressure within said housing and which pressure varies with the extent of movement of said movable plate.

8. The liquid seal of claim 7, including means resiliently biasing said movable plate in the direction of said fixed plate to maintain a fixed minimum pressure on said sealant material.

9. The liquid seal of claim 7, including a slipper surrounding said shaft and positioned in the region between said movable and fixed plates and in contact with said sealant material.

10. The liquid seal of claim 9, including retaining rings positioned in said groove in contact with the sides of said groove and the bore of said housing, a retaining ring surrounding said shaft in wedging engagement with said slipper and contacting the inner surface of said fixed plate, and a retaining ring positioned in contact with both the inner surface of said fixed plate and the inner peripheral surface of said flange, all of said retaining rings being composed of a relatively hard plastic or a hard plastic loaded with a lubricant.

References Cited
UNITED STATES PATENTS

| | | | |
|---|---|---|---|
| 2,308,149 | 1/1943 | Bingham | 277—188 X |
| 3,393,917 | 7/1968 | Kendall et al. | 277—103 |

SAMUEL ROTHBERG, Primary Examiner

U.S. Cl. X.R.

277—29, 188